(12) United States Patent
Kim et al.

(10) Patent No.: US 11,899,225 B2
(45) Date of Patent: Feb. 13, 2024

(54) CAMERA MODULE

(71) Applicant: SAMSUNG ELECTRO-MECHANICS CO., LTD., Suwon-si (KR)

(72) Inventors: In Gun Kim, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 306 days.

(21) Appl. No.: 17/005,532

(22) Filed: Aug. 28, 2020

(65) Prior Publication Data
US 2021/0063615 A1   Mar. 4, 2021

(30) Foreign Application Priority Data

Aug. 30, 2019   (KR) .................. 10-2019-0107762

(51) Int. Cl.
*G02B 7/02*      (2021.01)
*G02B 5/00*      (2006.01)

(52) U.S. Cl.
CPC ............. *G02B 5/003* (2013.01); *G02B 7/021* (2013.01)

(58) Field of Classification Search
CPC .... G02B 5/003; G02B 7/021; G02B 13/0035; G02B 13/0065; G02B 5/00; G02B 7/02; G03B 11/045; G03B 17/02; G03B 17/17; G03B 30/00; H04N 5/2251; H04N 5/2252; H04N 5/2253; H04N 5/2254; H04N 5/2257; H04N 5/225
See application file for complete search history.

(56) References Cited

U.S. PATENT DOCUMENTS

| | | | |
|---|---|---|---|
| 10,215,968 B2 | 2/2019 | Bae et al. | |
| 10,473,880 B2 | 11/2019 | Yang et al. | |
| 2003/0016454 A1* | 1/2003 | Yamaguchi | G02B 13/002 359/819 |
| 2004/0228011 A1* | 11/2004 | Yokota | G02B 5/003 359/811 |
| 2006/0050416 A1* | 3/2006 | Chung | G02B 7/021 359/819 |
| 2008/0316623 A1 | 12/2008 | Aoki et al. | |

(Continued)

FOREIGN PATENT DOCUMENTS

| | | |
|---|---|---|
| CN | 102436120 A | 5/2012 |
| CN | 102809795 A | 12/2012 |

(Continued)

OTHER PUBLICATIONS

Korean Office Action dated Jun. 28, 2021 in counterpart Korean Patent Application No. 10-2020-0109713. (7 pages in English and 3 pages in Korean).

(Continued)

*Primary Examiner* — Balram T Parbadia
(74) *Attorney, Agent, or Firm* — NSIP Law

(57) ABSTRACT

A camera module includes: a lens module including a plurality of lenses; a housing accommodating the lens module; a reflective member disposed in front of the lens module; an image sensor module to receive light passing through the lens module; and a first light shielding plate disposed in the housing in a space between the lens module and the image sensor module.

19 Claims, 11 Drawing Sheets

(56) References Cited

U.S. PATENT DOCUMENTS

| | | | |
|---|---|---|---|
| 2009/0160998 A1* | 6/2009 | Fukamachi | H04N 23/54 |
| | | | 156/60 |
| 2011/0157430 A1 | 6/2011 | Hosoya et al. | |
| 2012/0075518 A1 | 3/2012 | Okuda | |
| 2013/0010377 A1 | 1/2013 | Okuyama et al. | |
| 2015/0077841 A1 | 3/2015 | Matsuo et al. | |
| 2015/0253569 A1 | 9/2015 | Lin | |
| 2016/0154154 A1* | 6/2016 | Lee | G02B 5/208 |
| | | | 359/359 |
| 2016/0238919 A1 | 8/2016 | Nakano | |
| 2017/0160511 A1* | 6/2017 | Kim | G02B 13/002 |
| 2018/0031798 A1 | 2/2018 | Choi et al. | |
| 2018/0059379 A1 | 3/2018 | Chou | |
| 2018/0095204 A1 | 4/2018 | Lin et al. | |
| 2018/0299635 A1* | 10/2018 | Wan | G02B 27/0018 |
| 2018/0364450 A1 | 12/2018 | Lee et al. | |
| 2019/0179098 A1 | 6/2019 | Yang et al. | |
| 2019/0179103 A1 | 6/2019 | Yang et al. | |
| 2020/0366817 A1 | 11/2020 | Chang et al. | |

FOREIGN PATENT DOCUMENTS

| | | |
|---|---|---|
| CN | 102109666 B | 10/2014 |
| CN | 103718069 B | 5/2016 |
| CN | 207164335 U | 3/2018 |
| CN | 109917528 A | 6/2019 |
| CN | 109981942 A | 7/2019 |
| CN | 209167633 U | 7/2019 |
| JP | 7-325207 A | 12/1995 |
| JP | 2007-163637 A | 6/2007 |
| JP | 2010-20181 A | 1/2010 |
| JP | 2012-103681 A | 5/2012 |
| JP | 2015-15529 A | 1/2015 |
| JP | 2016-0090791 A | 5/2016 |
| JP | 2016-148772 A | 8/2016 |
| KR | 10-2018-0137278 A | 12/2018 |
| KR | 10-2019-0070231 A | 6/2019 |
| TW | 200916870 A | 6/1997 |
| TW | M533229 U | 12/2016 |
| TW | I600928 B | 10/2017 |
| TW | I704404 B | 9/2020 |

OTHER PUBLICATIONS

Taiwanese Office Action dated Sep. 29, 2021 in counterpart Taiwanese Patent Application No. 109129756 (9 pages in English and 11 pages in Mandarin).

Chinese Office Action dated Oct. 18, 2021, in counterpart Chinese Patent Application No. 202010894775.3 (10 pages in English and 12 pages in Chinese).

* cited by examiner

CAMERA MODULE

CROSS-REFERENCE TO RELATED APPLICATION(S)

This application claims the benefit under 35 USC 119(a) of Korean Patent Application No. 10-2019-0107762 filed on Aug. 30, 2019 in the Korean Intellectual Property Office, the entire disclosure of which is incorporated herein by reference for all purposes.

BACKGROUND

1. Field

The following description relates to a camera module.

2. Description of Related Art

Camera modules are used in portable electronic devices such as smartphones, in accordance with the demand for miniaturization of portable electronic devices, miniaturization of camera modules mounted on portable electronic devices is also required.

However, when a plurality of lenses is disposed in a thickness direction of the portable electronic device, since the thickness of the portable electronic device increases as the number of lenses increases, there is a problem in miniaturizing the portable electronic device.

When a plurality of lenses is disposed in a length direction or a width direction of the portable electronic device, even if the number of lenses increases, the thickness of the portable electronic device is not affected. However, in this case, since a diameter of the lens affects the thickness of the portable electronic device, there is a limitation in reducing the thickness of the portable electronic device by the diameter of the lens.

Meanwhile, since not all light refracted by a lens of a camera module is imaged on an image sensor, in general, it may be considered to thin the camera module and the portable electronic device by reducing the size of the lens by removing a portion of a circular lens. But in this case, there is a problem that flare may occur due to light reflection generated inside the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A camera module capable of reducing a size and preventing flare from occurring.

In one general aspect, a camera module includes a lens module including a plurality of lenses; a housing accommodating the lens module; a reflective member disposed in front of the lens module; an image sensor module to receive light passing through the lens module; and a first light shielding plate disposed in the housing in a space between the lens module and the image sensor module.

The first light shielding plate may define an opening through which the light passes, and a plurality of protrusions may be disposed on an inner wall of the opening.

Each of the protrusions may include a convex curved surface.

At least one surface of the first light shielding plate may be surface-treated to scatter light.

The camera module may include a light absorbing layer disposed on at least one surface of the first light shielding plate.

The camera module may include a second light shielding plate disposed in the space between the lens module and the image sensor module, and may be spaced apart from the first light shielding plate in an optical axis direction.

The second light shielding plate may define an opening through which the light passes, may include a plurality of protrusions disposed on an inner wall of the opening, and each of the protrusions may have a convex curved surface.

At least one surface of the second light shielding plate may be surfaced-treated to scatter light, or a light absorbing layer may be disposed on at least one surface of the second light shielding plate.

At least one lens of the plurality of lenses may have a length of any one axis of two axes, intersecting an optical axis and perpendicular to each other, being smaller than a length the other one axis. The at least one lens may be disposed such that a side surface facing the axis with the smaller length faces a first inner wall of the housing.

The camera module may include a first protruding portion protruding from the first inner wall of the housing into the space between the lens module and the image sensor module.

The first protruding portion may have an inclined surface, and a plurality of protrusions may be disposed on the inclined surface.

Each of the protrusions on the inclined surface may have a length along the inclined surface and have a convex curved surface.

The camera module may include a groove portion disposed in the space between the lens module and the image sensor module on the first inner wall of the housing.

The first protruding portion may have an inclined surface, and the inclined surface may be connected to the groove portion.

The first protruding portion and the groove portion may be disposed closer to the lens module than the first light shielding plate.

The at least one lens may be disposed such that a side surface facing the axis with the greater length faces a second inner wall of the housing, and a second protruding portion may protrude from the second inner wall into the space between the lens module and the image sensor module.

The second protruding portion may have an inclined surface, and a plurality of protrusions may be disposed on the inclined surface of the second protruding portion.

Each of the protrusions of the second protruding portion may have a length along the inclined surface of the second protruding portion and have a convex curved surface.

The housing may have a window configured to pass light so that the light that has passed through the lens module is received by the image sensor module, and a plurality of protrusions may be disposed on an inner wall of the window.

Each of the protrusions disposed on the inner wall of the window may have a convex curved surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
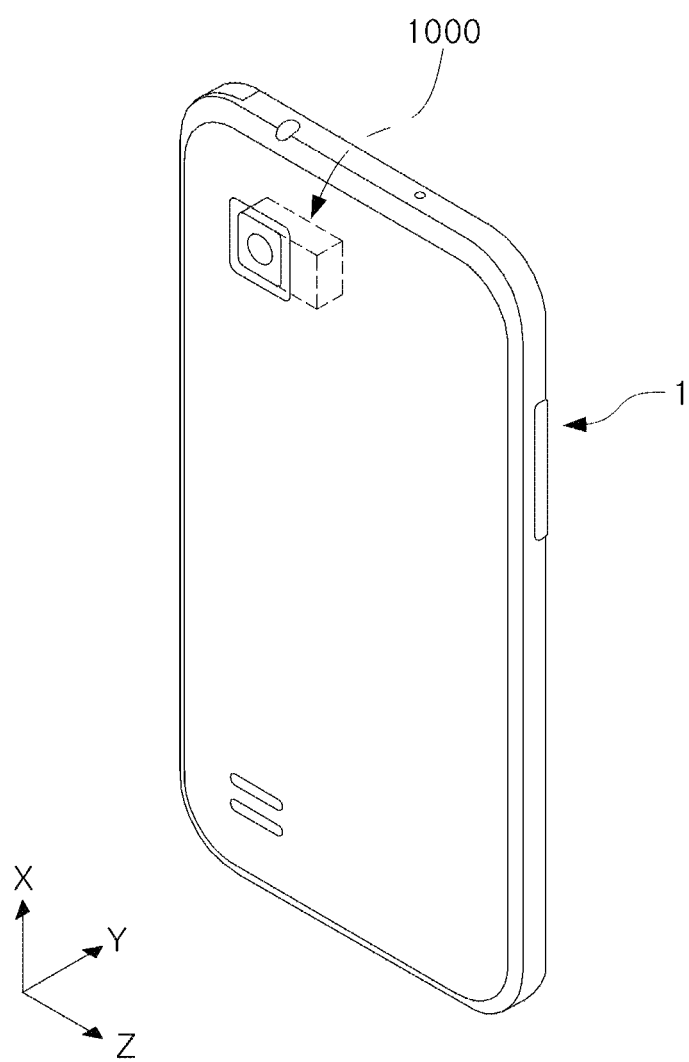
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of a portable electronic device according to an example.

Referring to FIG. 1, a portable electronic device 1 may be a portable electronic device, such as a mobile communication terminal, a smart phone, a tablet PC, or the like, on which a camera module 1000, is mounted.

As illustrated in FIG. 1, the camera module 1000 is mounted on the portable electronic device 1 to image a subject.

In the present example, the camera module 1000 includes a plurality of lenses, and an optical axis (a Z-axis) of the lens may be directed in a direction, perpendicular to a thickness direction (a Y-axis direction, a direction from a front surface of the portable electronic device toward a rear surface thereof or vice versa) of the portable electronic device.

For example, the optical axis (the Z-axis) of the plurality of lenses provided in the camera module 1000 may be formed in the width direction or the length direction of the portable electronic device 1.

Therefore, even if functions such as auto focusing (hereinafter, referred to as AF), optical zoom (hereinafter, referred to as zoom) and optical image stabilizing (hereinafter, referred to as OIS), or the like are provided in the portable electronic device 1, it is possible to prevent the thickness of the portable electronic device 1 from increasing. Accordingly, the portable electronic device 1 may be thinned.

The camera module 1000 may be provided with AF, Zoom, and OIS functions.

Since the camera module 1000 including AF, Zoom, OIS functions, and the like, needs to be provided with various parts, the size of the camera module is increased compared to the general camera module.

When the size of the camera module 1000 increases, there may be a problem in terms of miniaturization of the portable electronic device 1 on which the camera module 1000 is mounted.

For example, the camera module includes a plurality of lens groups for the zoom function. When the plurality of lens groups is disposed in the thickness direction of the portable electronic device, the thickness of the portable electronic device also increases according to the number of lens groups. Accordingly, if the thickness of the portable electronic device is not increased, the number of lens groups cannot be sufficiently secured, and thus the zoom performance is weakened.

In addition, to implement the AF, Zoom, and OIS functions, an actuator moving a plurality of lens groups in the optical axis direction or a direction, perpendicular to the optical axis should be installed. When the optical axis (the Z-axis) of the lens group is formed in the thickness direction of the portable electronic device, an actuator for moving the lens group should also be installed in the thickness direction of the portable electronic device. Therefore, the thickness of the portable electronic device is increased.

However, since the camera module 1000 according to an example is disposed such that the optical axes (the Z-axis) of the plurality of lenses are perpendicular to the thickness direction of the portable electronic device 1, even if the camera module 1000, provided with the AF, Zoom, and OIS functions is mounted thereon, the portable electronic device 1 can be thinned.

Figure 2:
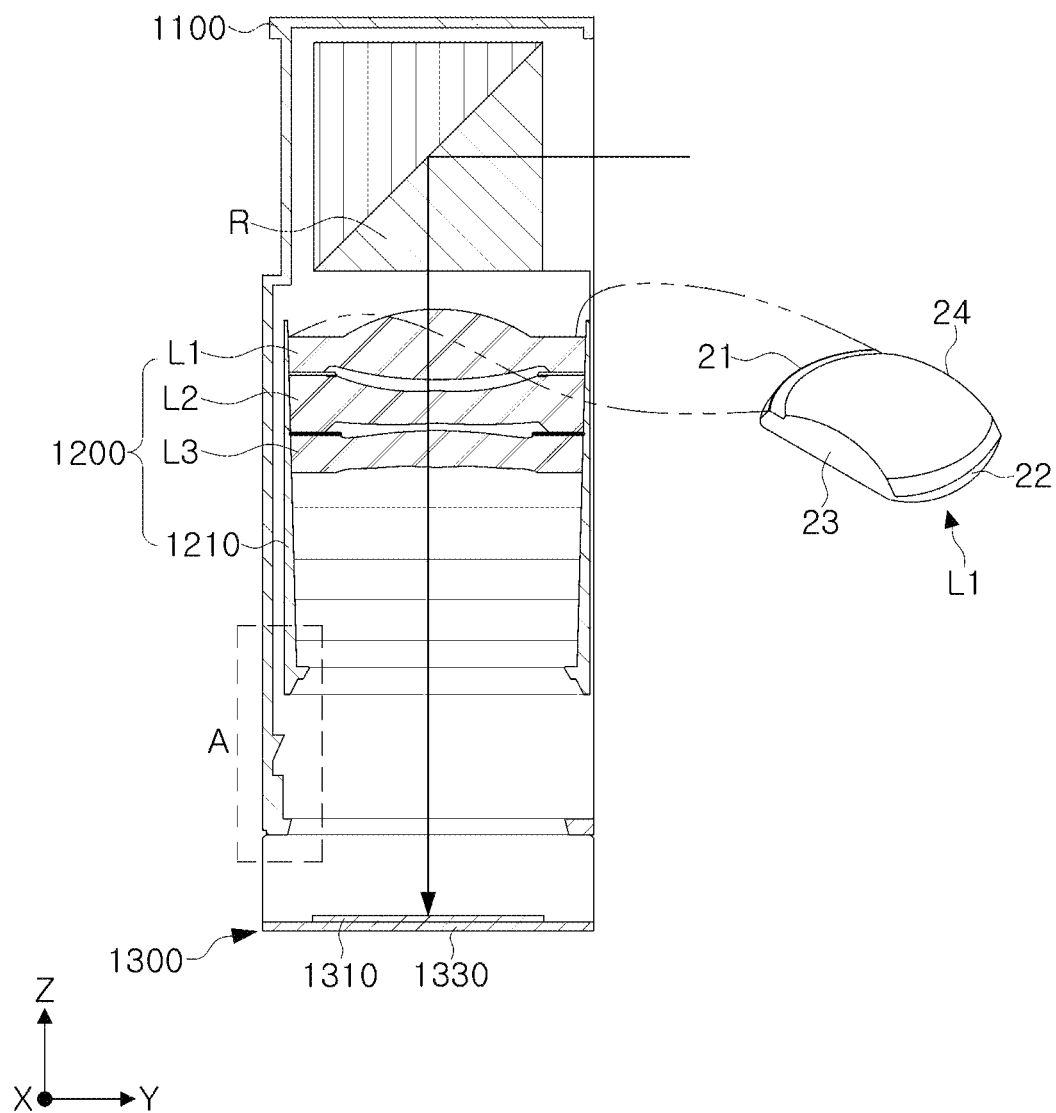
FIG. 2 is a schematic cross-sectional view of a camera module according to an example.
Figure 3:
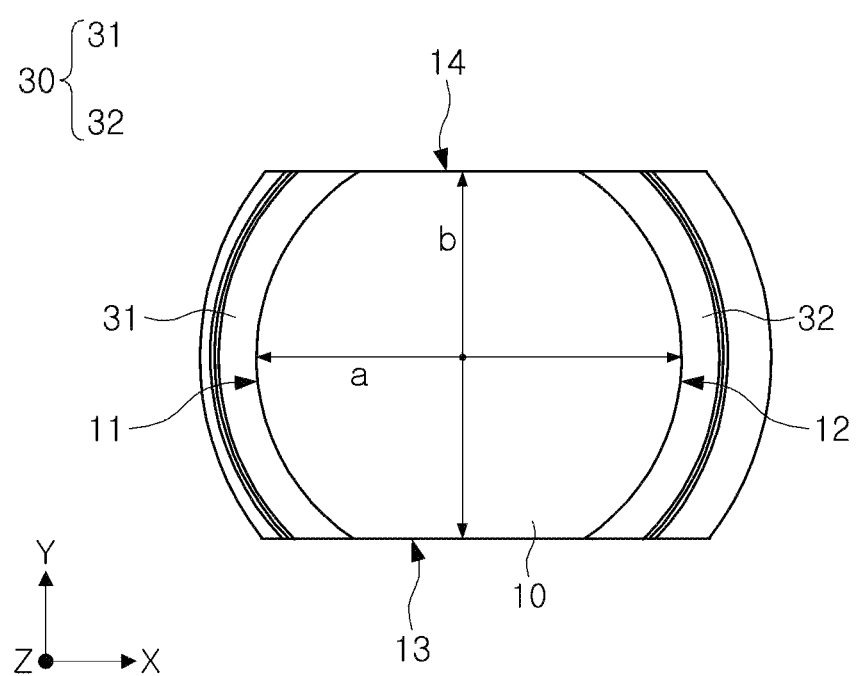
FIG. 3 is a plan view of a lens according to an example.

FIG. 2 is a schematic cross-sectional view of a camera module according to an example, and FIG. 3 is a plan view of a lens according to an example.

First, referring to FIG. 2, a camera module includes a housing 1100, a reflective member R, a lens module 1200, and an image sensor module 1300.

The reflective member R, the lens module 1200, and the image sensor module 1300 are sequentially provided from one side to the other side inside the housing 1100. The housing 1100 has an internal space to accommodate the reflective member R, the lens module 1200, and the image sensor module 1300. However, the image sensor module 1300 may be attached to an outside of the housing 1100.

The housing 1100 may have a box shape in which an upper portion (a right side of the housing 1100 in FIG. 2) is opened.

Although not shown in the drawing, the camera module covers the upper portion of the housing 1100, and includes a cover having an opening to allow light to be incident. The light incident through the opening of the cover is changed in a moving direction by the reflective member R to be incident on the lens module 1200.

The reflective member R is configured to change the travel direction of light. For example, the light incident on an inside of the housing 1100 may be changed in the moving direction to face the lens module 1200 through the reflective member R.

For example, the light incident in the thickness direction (the Y-axis direction) of the camera module is changed by the reflective member R to approximately coincident with the optical axis direction (the Z-axis direction) of the lens module 1200.

The lens module 1200 includes a plurality of lenses through which the light whose moving direction is changed by the reflective member R passes and a lens barrel 1210 accommodating the plurality of lenses.

Although a first lens L1, a second lens L2, and a third lens L3 are shown in FIG. 2 as a plurality of lenses, the configuration is not limited to the number of lenses.

The image sensor module 1300 includes an image sensor 1310 for converting light passing through the lens module 1200 into an electrical signal and a printed circuit board 1330 on which the image sensor 1310 is mounted. The image sensor module 1300 may further include a filter filtering light incident through the lens module 1200.

At least one of the plurality of lenses has a non-circular planar shape. For example, the first lens L1 has a non-circular shape, when viewed in the optical axis direction (the Z-axis direction). Alternatively, all of the plurality of lenses may also be formed in a non-circular shape.

Referring to FIG. 2, the first lens L1 has four side surfaces, and is formed such that two side surfaces face each other. In addition, the side surfaces facing each other are corresponding shapes.

For example, when viewed in the optical axis direction, the first side surface 21 and the second side surface 22 of the first lens L1 are arc-shaped, and the third side surface 23 and a fourth side surface 24 are generally straight-shaped.

The third side surface 23 and the fourth side surface 24 connect the first side surface 21 and the second side surface 22, respectively. In addition, the third side surface 23 and the fourth side surface 24 are symmetrical about the optical axis, and may be formed to be parallel to each other.

Referring to FIG. 3, each of the plurality of lenses may include an optical portion 10 and a flange portion 30, respectively.

The optical portion 10 may be a portion in which an optical performance of the first lens L1 is exhibited. For example, light reflected from a subject may be refracted while passing through the optical portion 10.

The optical portion 10 may have refractive power, and may have an aspherical shape.

In addition, the optical portion 10 includes an object-side surface (a surface facing the object side) and an image-side surface (a surface facing the image side) (the object-side surface is shown in FIG. 3).

The flange portion 30 may be a portion fixing the first lens L1 to another configuration, for example, the lens barrel 1210 or the second lens L2.

The flange portion 30 may extend around at least a portion of the optical portion 10, and may be integrally formed with the optical portion 10.

The optical portion 10 and the flange portion 30 are formed in a non-circular shape. For example, the optical portion 10 and the flange portion 30 are non-circular when viewed in the optical axis direction. Unlike this, the optical portion 10 may be formed in a circular shape, and the flange portion 30 may be formed in a non-circular shape.

The optical portion 10 includes a first edge 11, a second edge 12, a third edge 13, and a fourth edge 14. The first edge 11 and the second edge 12 are positioned to face each other, and the third edge 13 and the fourth edge 14 are positioned to face each other.

The third edge 13 and the fourth edge 14 connect the first edge 11 and the second edge 12, respectively.

When viewed in the optical axis direction, the first edge 11 and the second edge 12 have an arc shape, and the third edge 13 and the fourth edge 14 have a generally straight shape. The third edge 13 and the fourth edge 14 are symmetrical about the optical axis, and may be formed to be parallel to each other.

The optical portion 10 has a major axis (a) and a minor axis (b). For example, when viewed in the direction of the optical axis, a line segment connecting the third edge 13 and the fourth edge 14 at a shortest distance while passing through the optical axis is a minor axis (b), and a line segment, perpendicular to the minor axis (b), connecting the first edge 11 and the second edge 12 while passing through the optical axis is a major axis (a).

The length of the major axis (a) is longer than the length of the minor axis (b).

The flange portion 30 includes a first flange portion 31 and a second flange portion 32, the first flange portion 31 extends from the first edge 11 of the optical portion 10, and the second flange portion 32 extends from the second edge 12 of the optical portion 10.

The first edge 11 of the optical portion 10 may be a portion adjacent to the first flange portion 31, and the second edge 12 of the optical portion 10 may be a portion adjacent to the second flange portion 32.

The third edge 13 of the optical portion 10 may be one side surface of the optical portion 10 where the flange portion 30 is not formed, and the fourth edge 14 of the optical portion 10 may be the other side surface of the optical portion 10 where the flange portion 30 is not formed.

Referring to FIGS. 2 and 7-10, the first lens L1 is disposed such that the third side surface 23 or the fourth side surface 24 face a bottom surface 1101 of the housing 1100, and is disposed such that the first side surface 21 and the second side surface 22 face an internal side surface 1102 of the housing 1100. That is, the first lens L1 is disposed such that the minor axis (b) faces the thickness direction (the Y-axis direction) of the housing 1100, and is disposed such that the major axis (a) faces the width direction (the X-axis direction) of the housing 1100.

Therefore, the thickness of the housing 1100 can be reduced by reducing the length of the first lens L1 in the direction of the minor axis (b).

Figure 4:
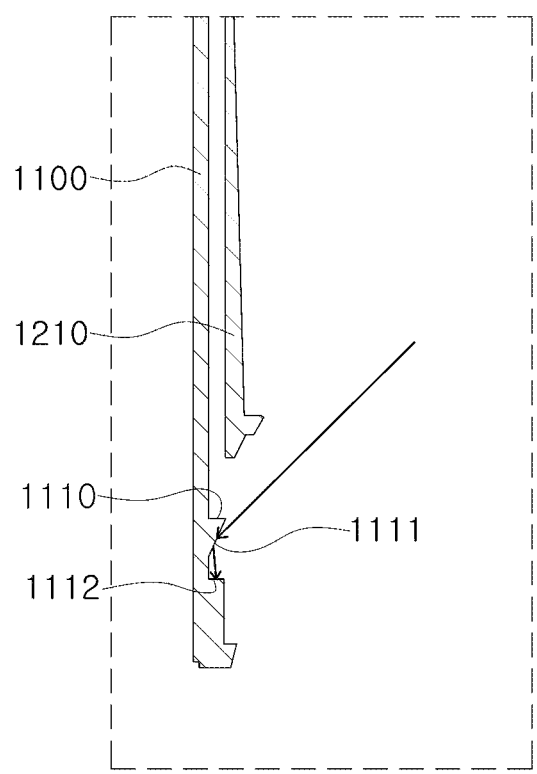
FIG. 4 is an enlarged view of part A of FIG. 2.
Figure 5:
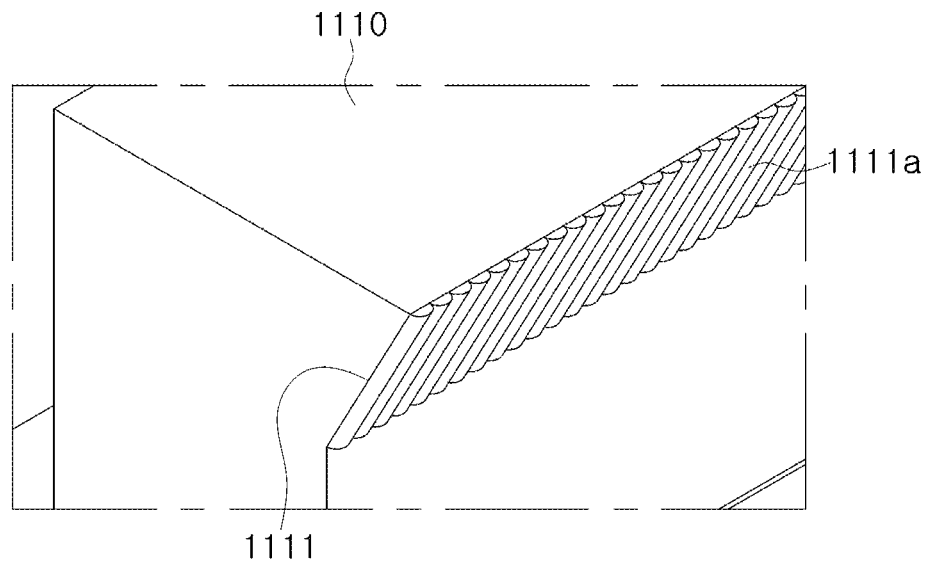
FIG. 5 is a perspective view of a first protruding portion of a housing according to an example.
Figure 6A:
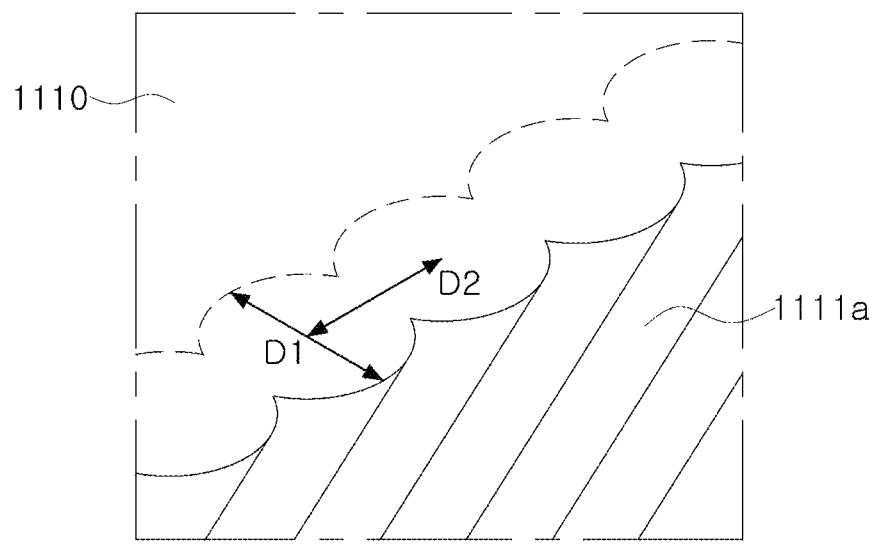
FIGS. 6A, 6B, and 6C are views illustrating a plurality of protrusions provided in the first protruding portion.
Figure 6B:
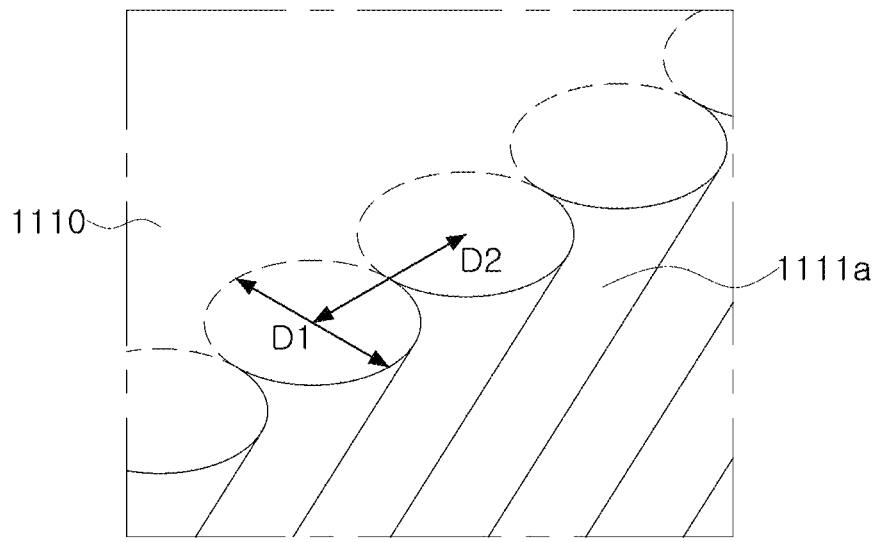
Figure 6C:
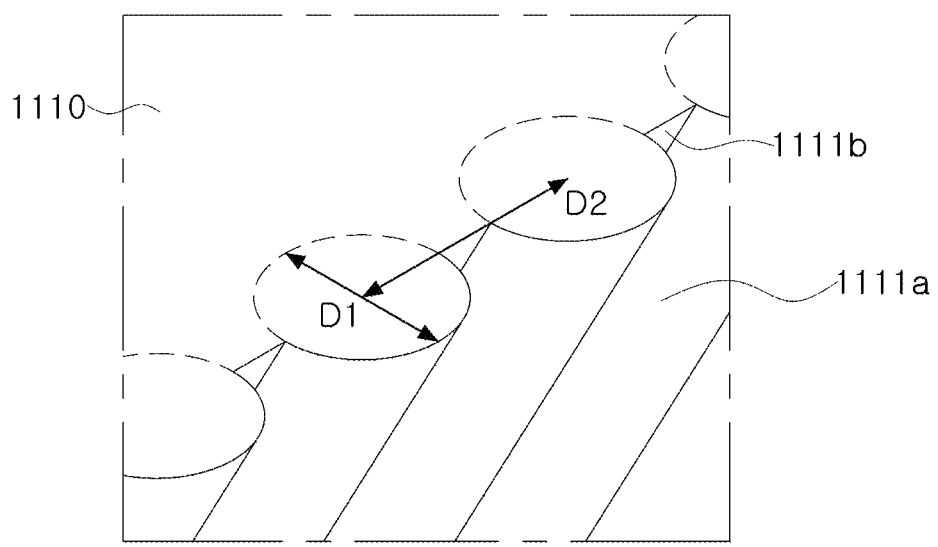

FIG. 4 is an enlarged view of part A of FIG. 2, FIG. 5 is a perspective view of a first protruding portion of the housing according to an example, and FIGS. 6A to 6C are views illustrating a plurality of protrusions provided in the first protruding portion.

Referring to FIG. 4, a first protruding portion 1110 may protrude from an internal wall of the housing 1100. The first protruding portion 1110 is disposed in a space between the lens barrel 1210 and the image sensor 1310.

The lens barrel 1210 may be moved in the optical axis direction (the Z-axis direction) for implementing autofocusing (AF) and/or zoom. Here, the first protruding portion 1110 of the housing 1100 can prevent the lens barrel 1210 from colliding with the image sensor 1310 side by limiting a moving range of the lens barrel 1210.

Meanwhile, a portion of light passing through the lens barrel 1210 may be reflected by hitting the internal wall of the housing 1100, and the reflected light may be incident on the image sensor 1310, causing a flare phenomenon.

In particular, since the first lens L1 is formed such that the length of a minor axis (b) is smaller than a major axis (a), a distance between the third side surface 23 or the fourth side surface 24 of the first lens L1 and the internal wall of the housing 1100 (e.g., the bottom surface 1101 of the housing 1100) is formed to be closer than a distance between the first side surface 21 or the second side surface 22 of the first lens L1 and the internal wall of the housing 1100 (e.g., the internal side surface 1102 of the housing 1100).

Further, since the minor axis (b) of the first lens L1 is disposed in the thickness direction of the housing 1100, in order to reduce the thickness of the housing 1100, the third side surface 23 or the fourth side surface 24 of the first lens L1 and the bottom surface 1101 of the housing 1000 needs to be disposed to be close.

Therefore, in the case of the bottom surface 1101 of the housing 1100, the possibility of the flare phenomenon due to internal reflection is higher than that of other internal walls of the housing 1100.

The camera module according to an example is configured to prevent a flare phenomenon from occurring due to internal reflection occurring on the bottom surface of the housing 1100.

A groove portion 1112 may be formed on the bottom surface 1101 of the housing 1100. The groove portion 1112 is disposed in a space between the lens barrel 1210 and the image sensor 1310.

For example, the groove portion 1112 may be formed closer to the image sensor 1310 than the first protruding portion 1110. In addition, one side of the groove portion 1112 may be connected to the first protruding portion 1110.

The first protruding portion 1110 may have a shape in which an internal diameter decreases toward the image sensor 1310 side. For example, the first protruding portion 1110 has an inclined surface 1111, and the inclined surface 1111 may be connected to the groove portion 1112.

Since the groove portion 1112 is formed on the bottom surface 1101 of the housing 1100, even though a portion of the light passing through the lens barrel 1210 is reflected by hitting the bottom surface 1101 of the housing 1100, the reflected light is blocked by the groove portion 1112 and is not incident on the image sensor 1310. Therefore, it is possible to prevent the flare phenomenon due to internal reflection occurring on the bottom surface 1101 of the housing 1100.

Meanwhile, even if the groove portion 1112 is formed on the bottom surface 1101 of the housing 1100 to block the reflected light, all the reflected light may not be blocked by the groove portion 1112 according to angles at which the light is reflected.

Therefore, the camera module according to an example is configured to prevent a flare phenomenon from occurring due to the reflected light even if light is reflected from the internal surface of the housing 1100.

For example, referring to FIG. 5, a plurality of protrusions 1111a may be provided on the inclined surface 1111 of the first protruding portion 1110 provided on the bottom surface of the housing 1110. The plurality of protrusions 1111a are provided to have a length along the inclined surface 1111. The plurality of protrusions 1111a include convex curved surfaces, respectively.

Therefore, the inclined surface 1111 of the first protruding portion 1110 is configured to have a different angle at which light is reflected depending on a position where the light is reflected. That is, the inclined surface 1111 of the first protruding portion 1110 is configured such that the reflected light is scattered even when the internal surface reflection occurs. Accordingly, light reflected from the inclined surface 1111 of the first protruding portion 1110 may not be collected at one point, and a flare phenomenon may be prevented from occurring.

When a diameter determined according to a curvature of a convex curved surface of one protrusion is called D1, and a distance between centers of adjacent protrusions is called D2, the plurality of protrusions 1111a may be provided to satisfy D1>D2. For example, the plurality of protrusions 1111a may be provided to partially overlap the adjacent protrusions, respectively (FIG. 6A).

Alternatively, the plurality of protrusions 1111a may be provided to satisfy D1=D2. For example, the plurality of protrusions 1111a may be provided to line contact with the adjacent protrusions, respectively (FIG. 6B).

Alternatively, the plurality of protrusions 1111a may be provided to satisfy D1<D2. For example, the plurality of protrusions 1111a may be provided to be spaced apart from each other (FIG. 6C). In this case, a flat surface 1111b may be disposed between the plurality of protrusions 1111a.

Figure 7:
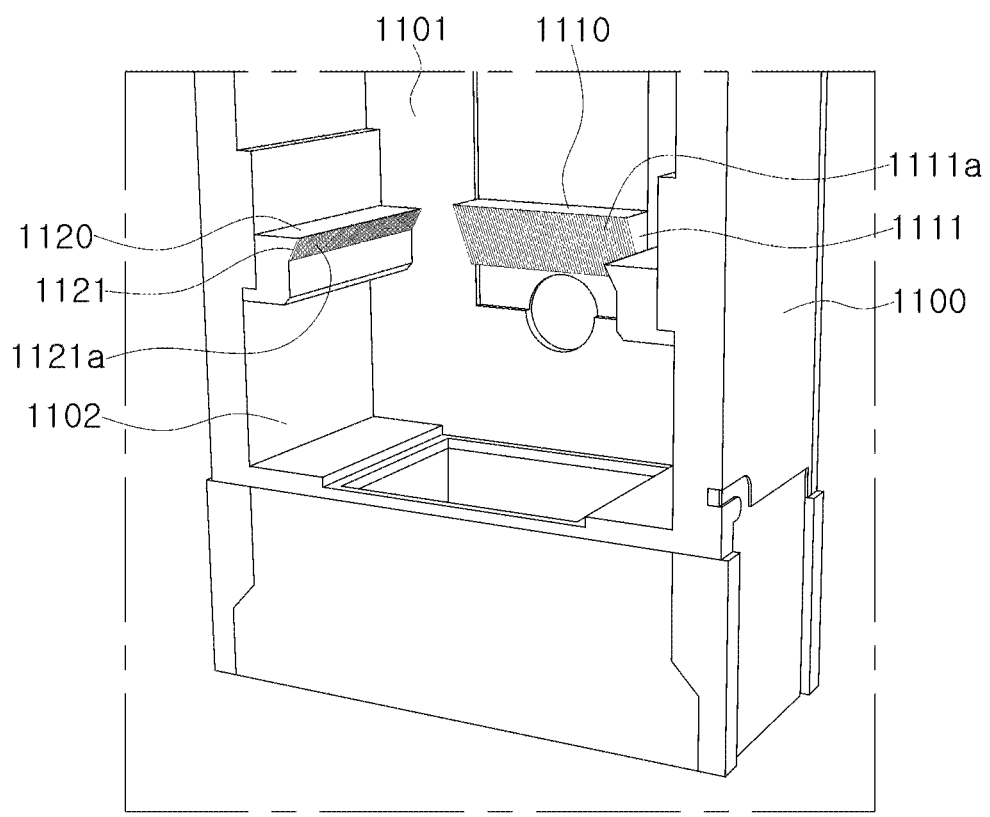
FIGS. 7 and 8 are perspective views illustrating a part of the housing of the camera module according to an example.
Figure 8:
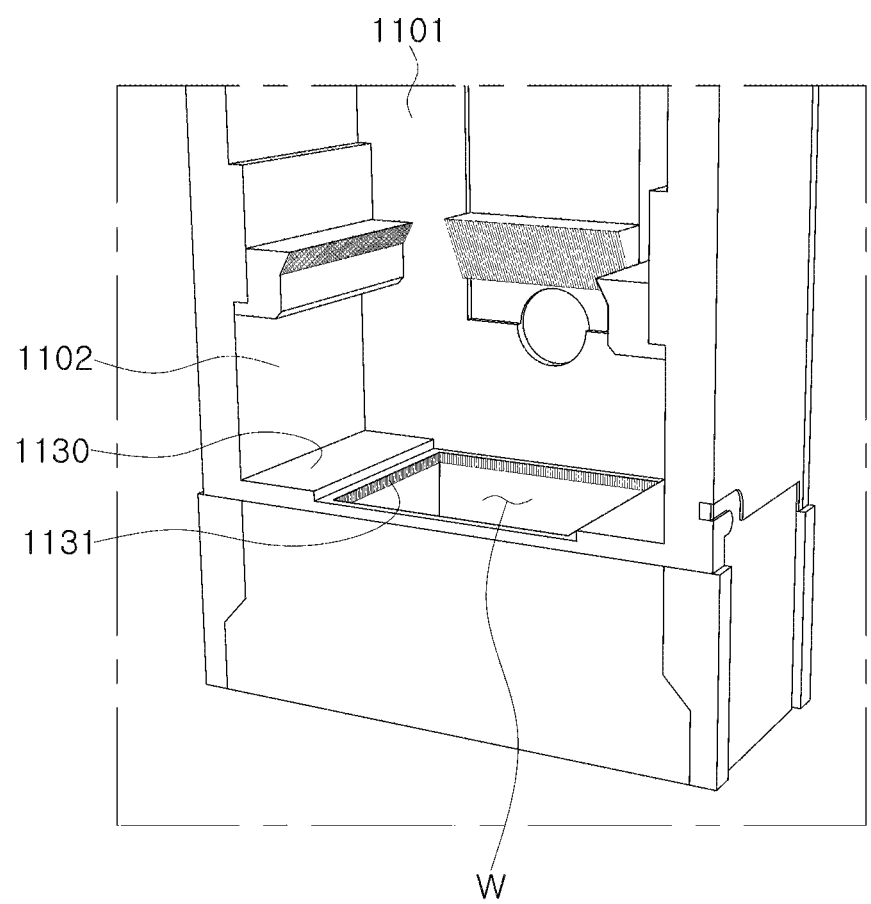

FIGS. 7 and 8 are perspective views illustrating a portion of a housing of a camera module according to an example.

First, referring to FIG. 7, a second protruding portion 1120 may protrude on the internal side surface 1102 of the housing 1100. The second protruding portion 1120 is disposed in a space between the lens barrel 1210 and the image sensor 1310.

Since the internal side surface 1102 of the housing 1100 is a surface facing the first side surface 21 or the second side surface 22 of the first lens L1, a distance between the first side surface 21 or the second side surface 22 of the first lens L1 and the internal side surface 1102 of the housing 1100 is formed to be relatively far. Therefore, a possibility that internal reflection occurs is less than that of the bottom surface 1101 of the housing 1100 on the internal side surface 1102 of the housing 1100.

However, due to the diffuse reflection of light, since there is also a possibility that internal reflection occurs on the internal side surface 1102 of the housing 1100, the camera module according to an example may be provided with the second protruding portion 1120 on the internal side surface 1102 of the housing 1100.

The second protruding portion 1120 may have a shape in which an internal diameter decreases toward the image sensor 1310. For example, the second protruding portion 1120 may have an inclined surface 1121, and a plurality of protrusions 1121a may be provided on the inclined surface 1121 of the second protruding portion 1120. The plurality of protrusions 1121a are provided to have a length along the inclined surface 1121. The plurality of protrusions 1121a include convex curved surfaces, respectively.

Therefore, the inclined surface 1121 of the second protruding portion 1120 is configured to have a different angle at which light is reflected depending on a position in which the light is reflected. That is, the inclined surface 1121 of the second protruding portion 1120 is configured such that the reflected light is scattered even when the internal reflection occurs. Accordingly, light reflected from the inclined surface 1121 of the second protruding portion 1120 may not be collected at one point, and a flare phenomenon may be prevented from occurring.

Referring to FIG. 8, a plurality of protrusions 1131 may also be provided on an internal wall of a window (W) provided in the housing 1100. The plurality of protrusions 1131 include convex curved surfaces, respectively.

The housing 1100 is provided with the window (W) in a form of an opening for passing light so that light passing the lens barrel 1210 can be incident on the image sensor 1310. The window (W) may be formed by a support plate 1130 to be extended from the internal wall of the housing 1100.

An infrared blocking filter that blocks light in an infrared region may be attached to the support plate 1130.

A portion of the light passing through the lens barrel 1210 may be reflected by hitting the internal wall of the window (W), and since the window (W) is disposed close to the image sensor 1310, the reflected light may be incident on the image sensor 1310 to occur a flare phenomenon.

Therefore, the camera module according to an example may be provided with the plurality of protrusions 1131 on an internal wall of the window (W) of the housing 1100. The plurality of protrusions 1131 include convex curved surfaces, respectively.

Accordingly, the reflected light may be scattered even if internal reflection occurs on the internal wall of the window (W). Accordingly, light reflected from the internal wall of the window (W) may not be collected at one point, and a flare phenomenon may be prevented from occurring.

Figure 9:
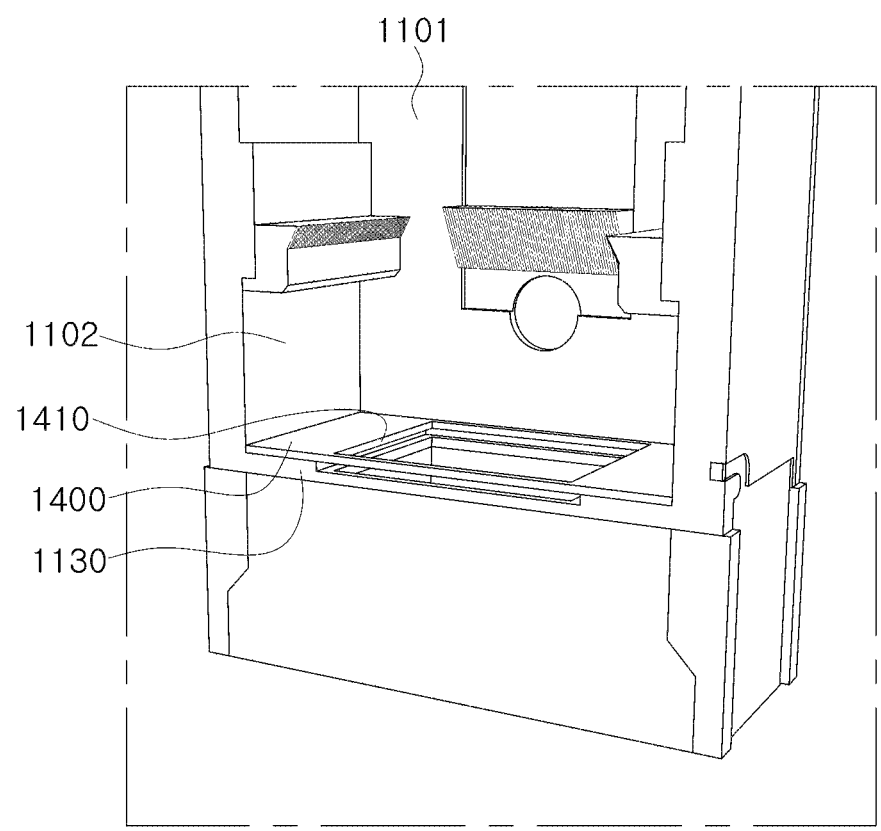
FIGS. 9 and 10 are perspective views illustrating a part of the housing of the camera module according to another example.
Figure 10:
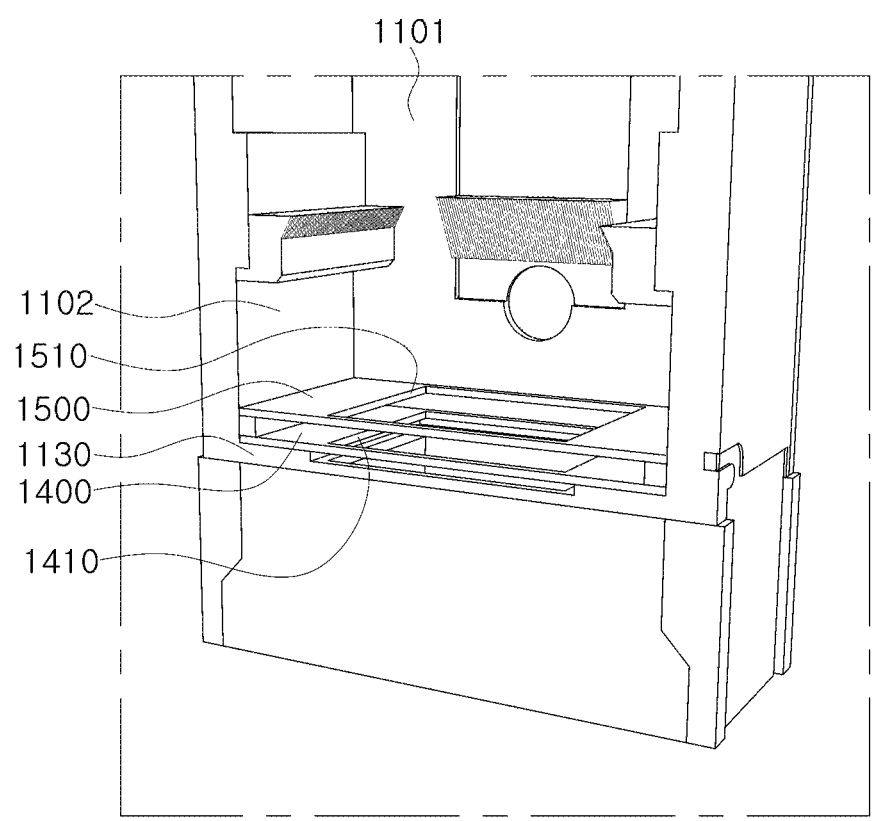

FIGS. 9 and 10 are perspective views illustrating a part of the housing of a camera module according to another example.

Referring to FIG. 9, a camera module includes a blocking plate 1400 inserted and disposed inside the housing 1100.

FIG. 9 illustrates an example in which the blocking plate 1400 is fitted to the housing 1100 so as to contact a support plate 1130 of the housing 1100 to which an infrared cut-out filter is attached, but is not limited to such a configuration.

That is, the blocking plate 1400 may be disposed in a space between the lens barrel 1210 and the image sensor 1310.

A surface of the blocking plate 1400 may be surface-treated to scatter light. For example, the surface of the blocking plate 1400 may be corrosion-treated and formed roughly. In addition, a light absorbing layer may be provided on the surface of the blocking plate 1400 to block unnecessary light. The light absorbing layer may be a black film or a black iron oxide.

The blocking plate 1400 has an opening 1410 for passing light so that light is incident on the image sensor 1310, and a plurality of protrusions may be provided on an internal wall of the opening 1410. The plurality of protrusions includes a convex curved surface, respectively.

By forming a structure to block light on the blocking plate 1400 and inserting and disposing it inside the housing 1100, a flare phenomenon can be easily prevented.

That is, since the blocking plate 1400 is a separate member from the housing 1100, it is possible to form various structures to block light without changing the shape of the housing 1100 itself.

Meanwhile, referring to FIG. 10, a plurality of blocking plates may be inserted and disposed inside the housing 1100.

A first blocking plate 1400 and a second blocking plate 1500 are illustrated as a plurality of blocking plates in FIG. 10, but the idea of the present disclosure is not limited to the number of blocking plates.

Like the first blocking plate 1400, the second blocking plate 1500 may also be surface-treated to scatter light. For example, a surface of the second blocking plate 1500 may be formed roughly by being corrosion-treated. In addition, a light absorbing layer may be provided on the surface of the second blocking plate 1500 to block unnecessary light. The light absorbing layer may be a black film or a black iron oxide.

The second blocking plate 1500 is provided with an opening 1510 for passing light so that light is incident into the image sensor 1310, and a plurality of protrusions may be provided on an internal wall of the opening 1510. The plurality of protrusions includes convex curved surfaces, respectively.

Figure 11:
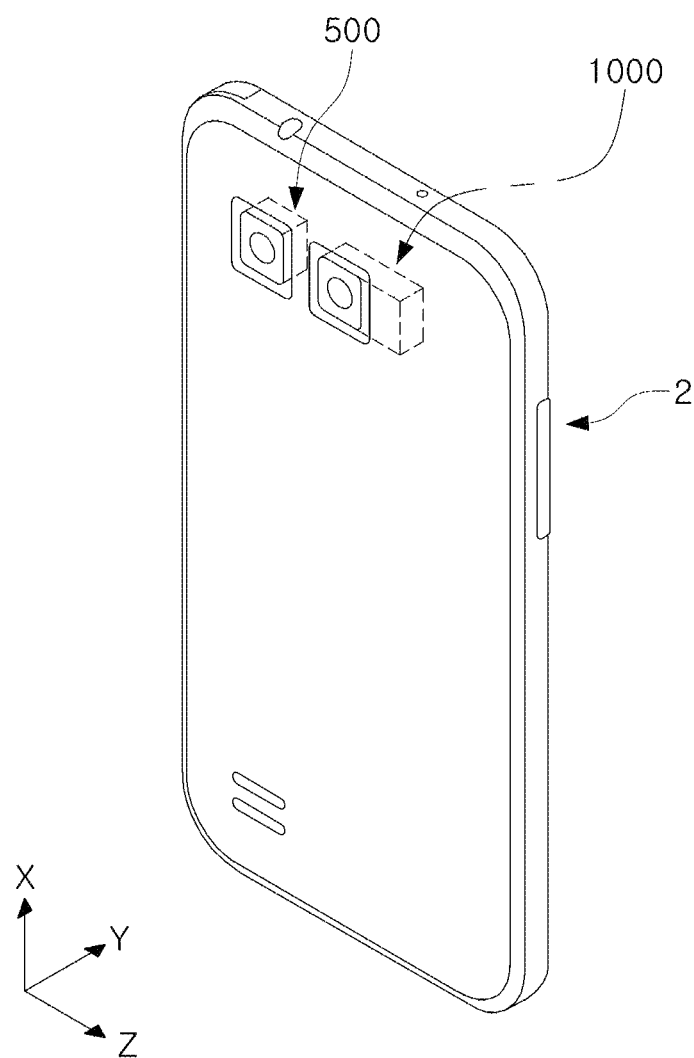
FIG. 11 is a perspective view of a portable electronic device according to another example.

FIG. 11 is a perspective view of a portable electronic device according to an example.

Referring to FIG. 11, a portable electronic device 2 may be a portable electronic device such as a mobile communication terminal a smartphone, a tablet PC, and the like on which a plurality of camera modules 500 and 1000 are mounted.

The first camera module 1000 and the second camera module 500 may be mounted on the portable electronic device 2.

The first camera module 1000 may be a camera module 1000 according to an example described with reference to FIGS. 2 to 10.

That is, in a case of a portable electronic device having a dual camera module, at least one of the two camera modules may be provided as the camera module 1000 according to an example disclosed herein.

The first camera module 1000 and the second camera module 500 are configured to have different angles of view.

The first camera module 1000 is configured to have a relatively narrow angle of view (e.g., telephoto view), and the second camera module 500 is configured to have a relatively wide angle of view (e.g., wide angle view).

For example, the angle of view of the first camera module 1000 may be formed in a range of 10° to 25°, and the second camera module 500 may be formed in a range of 75° to 85°.

By designing the angle of view of the two camera modules differently, an image of a subject can be photographed at various depths.

As set forth above, according to the various example, a camera module may reduce the size and prevent flare from occurring.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing defining an inner space;
a lens module disposed in the inner space of the housing and including a lens barrel and a plurality of lenses accommodated in the lens barrel;
a reflective member disposed in front of the lens module;
an image sensor module configured to receive light passing through the lens module;
a first light shielding plate disposed in the housing in a space between the lens module and the image sensor module; and
a first protruding portion protruding from a first inner wall of the housing into the space between the lens module and the image sensor module, the first protruding portion including an inclined surface and a plurality of first protrusions disposed along the inclined surface, each of the first protrusions on the inclined surface having a length along the inclined surface and including a convex curved surface.

2. The camera module of claim 1, wherein the first light shielding plate defines an opening through which the light passes, and
a plurality of second protrusions is disposed on an inner wall of the opening.

3. The camera module of claim 2, wherein each of the second protrusions comprise a convex curved surface.

4. The camera module of claim 1, wherein at least one surface of the first light shielding plate is surface-treated to scatter light.

5. The camera module of claim 1, further comprising a light absorbing layer disposed on at least one surface of the first light shielding plate.

6. The camera module of claim 1, further comprising a second light shielding plate disposed in the space between the lens module and the image sensor module, and spaced apart from the first light shielding plate in an optical axis direction.

7. The camera module of claim 6, wherein the second light shielding plate defines an opening through which the light passes, comprises a plurality of protrusions disposed on an inner wall of the opening, and each of the protrusions comprise a convex curved surface.

8. The camera module of claim 6, wherein at least one surface of the second light shielding plate is surfaced-treated to scatter light, or a light absorbing layer is disposed on at least one surface of the second light shielding plate.

9. The camera module of claim 1, wherein at least one lens of the plurality of lenses has a length of any one axis of two axes, intersecting an optical axis and perpendicular to each other, being smaller than a length the other one axis, and
the at least one lens is disposed such that a side surface facing the axis with the smaller length faces the first inner wall of the housing.

10. The camera module of claim 9, wherein the at least one lens is disposed such that a side surface facing the axis with the greater length faces a second inner wall of the housing, and
a second protruding portion protrudes from the second inner wall into the space between the lens module and the image sensor module.

11. The camera module of claim 10, wherein the second protruding portion has an inclined surface, and a plurality of third protrusions is disposed on the inclined surface of the second protruding portion.

12. The camera module of claim 11, wherein each of the third protrusions of the second protruding portion has a length along the inclined surface of the second protruding portion and comprise a convex curved surface.

13. The camera module of claim 1, further comprising a groove portion disposed in the space between the lens module and the image sensor module on the first inner wall of the housing.

14. The camera module of claim 13, wherein the first protruding portion has an inclined surface, and the inclined surface is connected to the groove portion.

15. The camera module of claim 13, wherein the first protruding portion and the groove portion are disposed closer to the lens module than the first light shielding plate.

16. The camera module of claim 1, wherein the housing has a window configured to pass light so that the light that has passed through the lens module is received by the image sensor module, and
- a plurality of second protrusions is disposed on an inner wall of the window.

17. The camera module of claim 16, wherein each of the second protrusions disposed on the inner wall of the window comprise a convex curved surface.

18. A camera module, comprising:
- a housing defining an inner space;
- a lens module disposed in the inner space of the housing and including a lens barrel and a plurality of lenses accommodated in the lens barrel;
- a reflective member disposed in front of the lens module;
- an image sensor module configured to receive light passing through the lens module; and
- a protruding portion protruding from an inner wall of the housing into a space between the lens module and the image sensor module, the protruding portion including an inclined surface and a plurality of protrusions disposed along the inclined surface, each of the protrusions on the inclined surface having a length along the inclined surface and including a convex curved surface.

19. The camera module of claim 18, further comprising a light shielding plate disposed in the housing in the space between the lens module and the image sensor module.

* * * * *